United States Patent Office 3,396,086
Patented Aug. 6, 1968

3,396,086
RECOMPRESSION EVAPORATORS
Roy Starmer, Cullercoats, North Shields, Northumberland, England, assignor to Applied Research and Engineering Limited, Peterlee, England, a British company
Filed Dec. 23, 1964, Ser. No. 420,724
1 Claim. (Cl. 202—183)

ABSTRACT OF THE DISCLOSURE

This invention provides improved apparatus and processes for the evaporative distillation of liquids having solid particles in solution wherein at least some of the vapor from the evaporator is brought into contact with a liquid distillate discharged from the evaporator before the vapor passes to the compressor. The vapor is thereby washed to remove undesirable particles from the liquid to prevent their accumulation in, and subsequent fouling of, the compressor.

---

Figure 1:
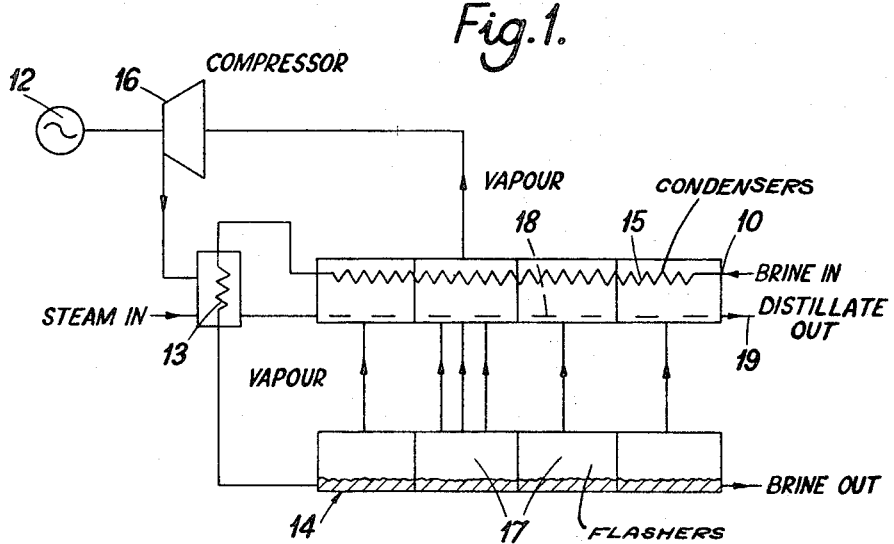

This invention relates to processes and apparatus for the distillation of liquids in which a stream of liquid is evaporated to produce vapour which vapour is then compressed by means of a mechanical compressor and used as a heating medium for further liquid to be evaporated. More specifically the invention relates to processes for the distillation of liquids having solid particles in solution, for example, sea-water.

A problem encountered with such processes and apparatus is that solid particles (e.g. salt) deposit on the inside of the compressor affect its performance and mechanical reliability. In apparatus and processes presently in use, before the vapours are compressed, they are passed through moisture separation devices, but even so, the resultant vapours can still carry small liquid droplets which give a small residual content to the distillate. The action of the compressor adds heat to the vapour and droplets, which droplets then vapourise, so depositing the solid particles (e.g. salt) on the inside of the compressor.

It is an object of the invention to provide a process and apparatus which minimises or at least substantially reduces said deposit of solid particles.

The invention provides, at least in one of its aspects, a process for the distillation of liquids in which a stream of liquid is evaporated to produce vapour, which vapour is then partially condensed by passing it over a heat exchanger and the remainder, or at least some of the remainder, which has passed over the exchanger is then compressed in a compressor whereby the condensate formed on the heat exchanger serves to remove from the vapour, droplets of the original liquid, and droplets which are drawn into the compressor will, largely, have a percentage of solid content equivalent to that of the condensate and not of the original liquid.

The invention also provides in another of its aspects a process for the distillation of liquids in which a stream of liquid is evaporated to produce vapour, which vapour is then washed and then compressed in a compressor, whereby the washing liquid serves to remove from the vapour, droplets of the original liquid, and droplets which are drawn into the compressor will, largely, have a percentage of solid content equivalent to that of the washing liquid and not of the original liquid.

Preferably the washing liquid is condensed vapour (e.g. from the compressor) and serves also to condense a proportion of the washed vapour.

In the preferred use of the invention the liquid is brine (e.g. sea-water) which brine may have a salt content of about 50 thousand parts/million.

Preferably the liquid is evaporated by means of a flash evaporator.

The vapours may be drawn through a droplet separating device passing to the heat exchanger and through a second droplet separating device between the heat exchanger and the compressor.

In the case where the vapour is washed, the vapour is preferably washed with liquid having a temperature which is equal to or lower than the vapour temperature.

The invention further provides apparatus for the distillation of a liquid using the above processes. In one form of the invention the apparatus comprises an evaporator for the production of vapour from the liquid, a condenser for condensing some of the vapour produced, and a compressor for compressing at least some of the remainder of the vapour for use as a heating medium. In accordance with one embodiment of the invention the arrangement is such that the compressor compresses vapour which has passed the condenser and been scrubbed by the condensate produced thereby. In another form of the invention the apparatus comprises an evaporator for the production of vapour from the liquid, a washer for washing some of the vapour produced and a compressor for compressing at least some of the remainder of the vapour for use as a heating medium. In accordance with this embodiment the compressor compresses vapour which has passed through the washer and has been scrubbed by the washing liquid. In the latter case the washing liquid is preferably condensed vapour (e.g. vapour which has been compressed and condensed by giving up heat to the liquid being evaporated) and the washing liquid may be passed through a cooling device before it is passed into the washing device.

Figure 2:
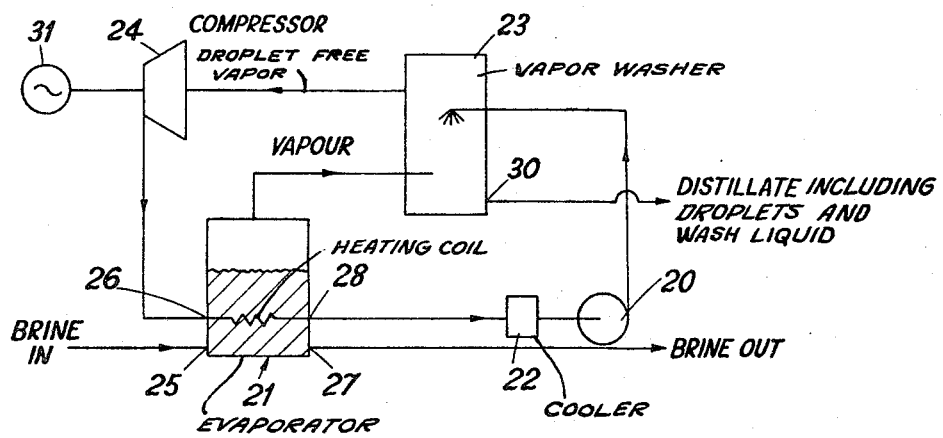

By way of example, two embodiments of the distillation process and apparatus therefor in accordance with the invention will now be described with reference to the accompanying drawings in which:

FIGURE 1 is a diagrammatic representation of the recompression cycle of the first embodiment, and FIGURE 2 is a diagrammatic representation of the recompression cycle of the second embodiment.

With reference to FIGURE 1, brine is fed at 10 into a continuous distillation circuit. The circuit comprises a brine circulating pump (not shown), a brine heating heat exchanger 15, a flash evaporator 14, a second brine heating heat exchanger 13 and a compressor 16 driven by a motor 12. The heater 13 is supplied with heat from an external source (e.g. steam) and from the compressed vapour from compressor 16. The evaporator comprises a succession of flash evaporation trays for the production of vapour. The heated brine passes from the heater 13 along the trays in succession, the vapour pressure in the chambers 17 above the trays decreasing along the succession. The vapour from the evaporation trays is passed over a droplet separator to the first heat exchanger 13 which serves as a condenser. The condensate falls into trays 18 and leaves at 19. The condensate also serves to remove from the vapour, droplets of the brine.

The vapour which passes the heater condenser 15 is then drawn through the compressor 16 by which it is heated and it is then passed to the heater 13 to give further heat to the incoming brine which has already passed through the heater-condenser 15 and been heated by the vapours. The vapours may pass through a second droplet separator before being drawn through the compressor.

With reference to FIGURE 2, the circuit comprises a pump 20, an evaporator 21, a cooling device 22, a washer 23 and a compressor 24 driven by a motor 31. The heated brine is fed at 25 into the evaporator where it is partly evaporated, the remainder leaving at 27. The vapour passes into the washing chamber 23 wherein it is scrubbed by liquid at a lower temperature which condenses a part of the vapour and removes brine droplets. The mixture of condensate and washing liquid passes out at 30 as a product of the process. The remaining vapour, substantially free of brine droplets, passes to the compressor 24 wherein it is compressed and it then passes at 26 into the heating coil 31 of evaporator 21 to vapourise the brine. The vapour is thereby condensed, at least in part, and passes through the pump 20 and cooling device 22 to a spray in the washing chamber 23 where it serves as the washing liquid.

It will be seen from both the figures that the vapour drawn into the compressor will, largely, have a percentage of solid content equivalent to that of the condensate or the washing liquid and not that of the concentrated brine.

I claim:
1. An apparatus for the distillation of a liquid comprising:
   an evaporator for the production of vapours from the liquid,
   a vapour washing chamber having a vapour inlet connected to a vapour outlet from the evaporator and a vapour outlet,
   means to inject washing liquid into the chamber arranged to direct a spray of the washing liquid at vapour passing between the inlet and the outlet,
   means for directly removing liquid from the chamber,
   a compressor connected to the vapour outlet from the vapour washing chamber for compressing only vapour, the compressor compressing at least some of the vapour for use as a heating medium to heat the liquid, and
   the vapour washing liquid is liquid distillate discharged from the evaporator.

References Cited

UNITED STATES PATENTS

| 3,183,174 | 5/1965 | Williamson | 203—40 X |
| 3,218,241 | 11/1965 | Checkovich | 203—11 X |
| 3,257,290 | 6/1966 | Starmer | 202—180 X |
| 3,165,435 | 1/1965 | Henszey | 203—26 |
| 3,230,155 | 1/1966 | Schurch | 203—26 |
| 3,294,649 | 12/1966 | Powell | 203—26 X |
| 3,282,797 | 11/1966 | Hammer | 203—26 X |

FOREIGN PATENTS

| 308,736 | 5/1930 | Great Britain. |
| 525,122 | 1/1954 | Belgium. |

NORMAN YUDKOFF, *Primary Examiner.*

J. SOFER, *Assistant Examiner.*